United States Patent [19]

Mercat

[11] Patent Number: 5,081,877
[45] Date of Patent: Jan. 21, 1992

[54] STEPLESSLY VARIABLE TRANSMISSION

[75] Inventor: Jean-Pierre Mercat, Chateau Renault, France

[73] Assignee: Look, S.A., Nevers Cedex, France

[21] Appl. No.: 561,527

[22] Filed: Aug. 1, 1990

[30] Foreign Application Priority Data

Aug. 3, 1989 [EP] European Pat. Off. ........ 89114383.6

[51] Int. Cl.$^5$ .................. F16H 29/04; B62M 1/02
[52] U.S. Cl. ........................................ 74/116; 74/63;
74/117; 280/236; 280/260
[58] Field of Search .............. 74/63, 116, 117, 118,
74/594.2; 280/236, 259, 260

[56] References Cited

U.S. PATENT DOCUMENTS

| 2,547,453 | 4/1951 | Egy ................................ 74/117 X |
| 3,803,931 | 4/1974 | Bianchini et al. ..................... 74/117 |
| 4,505,163 | 3/1985 | Falkner .................................. 74/63 |
| 4,712,450 | 12/1987 | Takamiya et al. ................... 74/63 X |
| 4,916,974 | 4/1990 | Kozakae et al. ............... 74/594.2 X |

FOREIGN PATENT DOCUMENTS

A2-280481 8/1988 European Pat. Off. .
8812584 9/1988 France .

Primary Examiner—Allan D. Herrmann
Assistant Examiner—David W. Laub
Attorney, Agent, or Firm—Townsend and Townsend

[57] ABSTRACT

A steplessly variable transmission is described in which a driving element and a driven element are adjustable eccentrically to one another and are coupled via pivotal levers which are journalled on one element and can be brought into force transmitting clamping engagement with the other element via coupling shoes. In the context of this series connection the two change speed units are inversely combined with an eccentric positioning device being provided which either jointly actuates the members with the ring tracks associated with the coupling elements or the members with the coupling elements. The force transmitting zones of engagement of the two units are angularly displaced relative to one another and the eccentricities of the two units and also the lever arms associated with the coupling elements can be so selected that ideal transmission ratios result which are largely free of fluctuations.

12 Claims, 6 Drawing Sheets

STEPLESSLY VARIABLE TRANSMISSION

BACKGROUND OF THE INVENTION

A transmission of this kind is known from EP-A2-280 481 and has two change speed stages which are connected in series between the driving element and a driven element. The driving element is formed in this known transmission by the pedal crank of a bicycle and the driven element is formed by toothed ring associated with this pedal crank. The stepless speed change in EP-A2-280 481 comprises a cam assembly whose eccentricity is adjustable relative to a center shaft. The device includes a carrier rotatably arranged about the eccentric cam assembly, rotary members on input and output sides, and friction pieces arranged in two rows, each row including a plurality of the friction pieces. The friction pieces in one row are rockably connected to the rotary member on the input side and the free ends of the friction pieces engage the inside of the carrier. The friction pieces in the other row are rockably connected to the carrier and the free ends of these friction pieces engage the inside of the rotary member on the output side.

In all known steplessly variable transmissions of this kind, and indeed also with single stage transmissions, the problem exists that speed fluctuations arise as a result of the sequential force transmitting engagement, of the coupling elements which take place in each case, and these can cause torsional oscillations and undesired loadings, and also disturbing noises. When using such steplessly variable transmissions in bicycles these fluctuations can also be perceived during pedalling as disturbing jolt-like sequential fluctuations of movement.

These fluctuations which occur with such transmissions depend on the layout or geometry of the particular transmission, and in particular also depend on the number of the transmission elements that are used in the form of pivotal levers provided with coupling elements. The greater the number of such pivotal levers can be selected the smaller are the said fluctuations, however an increase in the number of the pivotal levers and coupling elements not only leads to a substantial increase in cost, but above all also to a more complicated overall construction, and indeed also to an increased space requirement which is not acceptable for many applications.

Furthermore, a speed changing range which is as large as possible is required of such transmissions and design limits exist when using a single stage transmission. In accordance with EP-A2-280 481 two change speed stages are connected in series in order to enlarge the change speed range. In this manner one does indeed succeed in obtaining a larger speed changing range, since the total transmission ratio which can be achieved with a series connection of this kind corresponds approximately to the product of the speed changing ratios of the two individual stages, however the substantial disadvantage exists that, with a series connection of this kind, very large aperiodic variations or transmission fluctuations occur in the transmission part between the input and output members.

SUMMARY OF THE INVENTION

The object of the invention is to form a steplessly variable transmission of the initially named kind with little design complication in such a way that, on the one hand, a high speed changing range can be achieved and, on the other hand, the variations of fluctuations in the transmission path between the input member and the output member can be minimised so that disturbing effects of said fluctuations can be practically precluded. Moreover, the transmission should have a low space requirement, should develop no disturbing noises and should be suitable for transmitting large forces or moments.

This object is satisfied in accordance with the invention in that that the change speed units are combined pairwise inversely and each unit pair has an eccentric positioning device which jointly actuates either the members with the ring tracks or the members with the coupling elements.

Through the inverse series connection of two change speed units one obtains an arrangement which is in principle centrally symmetric, with the output member of the first stage and the input member of the second stage having the same periods and the same angular speeds.

The second change speed stage is preferably so constructed that the variations or speed fluctuations of the two change speed stages which result over 360° are very similar and preferably identical.

If then, in accordance with a further special feature of the invention, the respective force transmitting regions between the two change speed stages, in which the coupling members clampingly engage in force transmitting manner with the respectively associated ring track, are so angularly displaced relative to one another that the speed maximas of the first stage are at least substantially in phase with the speed minimas of the second stage then ideal values can be obtained with respect to the speed fluctuations or variations.

The reduction of the disturbing speed fluctuations which is made possible by the invention also leads to an optimising of the transmission characteristics of a steplessly variable transmission of this kind, since disturbing torsional oscillations and the creation of noise can be avoided while ensuring a large speed changing range, and at the same time high transmission performances can be ensured.

BRIEF DESCRIPTION OF DRAWINGS

The invention now be explained in more detail when reference to the drawings in which are shown:

FIG. 1 a schematic illustration to explain the principles of construction of a steplessly variable transmission in accordance with the invention, FIG. 2 an axially sectioned representation of an embodiment of a two-stage transmission in accordance with the invention, which is integrated into the rear wheel hub of a bicycle, FIG. 3 a cross-sectional representation of the transmission of FIG. 2, with the section extending through the first change speed unit which is located in the centered position, FIG. 4 a representation corresponding to the sectional representation of FIG. 3, with the first eccentric unit however being located in the position of maximum eccentricity, FIG. 5 a cross-sectional representation of the transmission of FIG. 2, with the sectional plane extending through the second change speed unit which is located in the position of maximum eccentricity, and FIG. 6 a schematic diagrammatic representation to explain the cooperation of the two change speed units with respect to the minimising of fluctuations.

DESCRIPTION OF PREFERRED EMBODIMENTS

Figure 1:
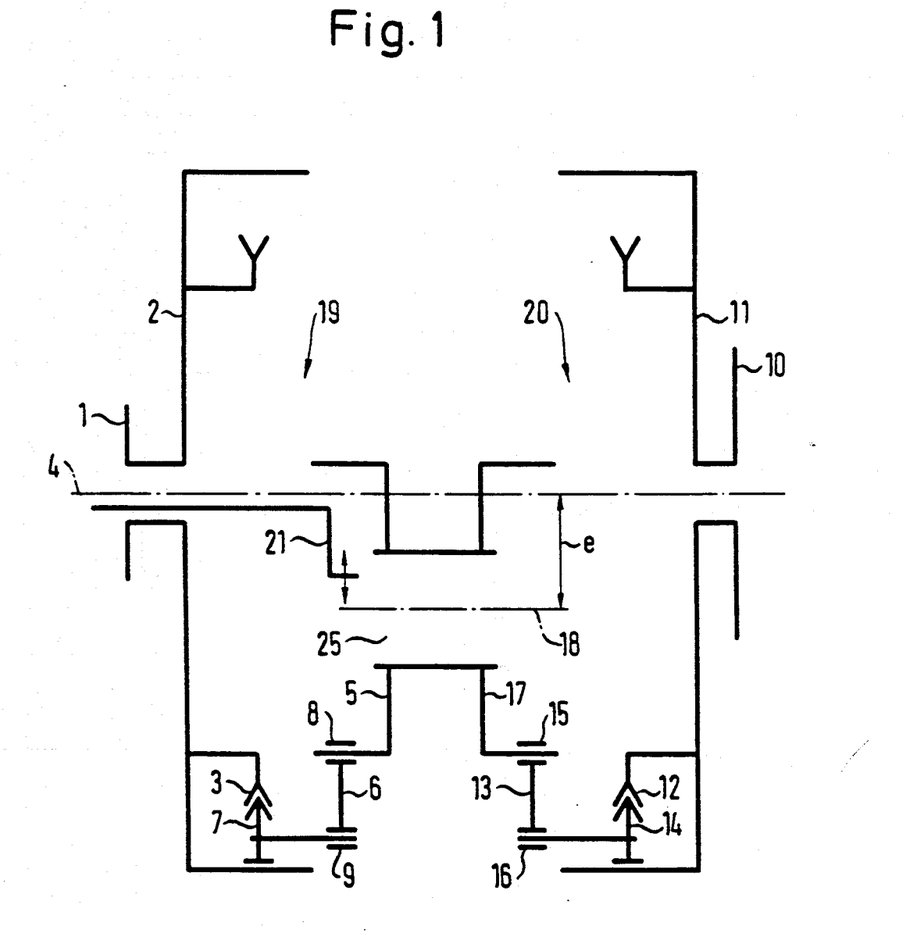

The schematic representation of FIG. 1 shows an inverse series connection of two change speed units 19, 20, with each of these two units having a basic construction, when considered on its own, such as is for example illustrated and described with respect to its function in French patent application No. 88 12 584.

The first transmission unit 19 has a driving element 1, which can for example consist of a driving sprocket of a bicycle, and this driving element 1 is connected with an annular drum-like input member 2 which has a schematically illustrated first ring track or race. Several coupling elements 7 journalled on pivotal levers 6 and distributed around the periphery cooperate with this ring track or race 3, with the pivotal levers 6 which each carry a coupling element 7 at one end being journalled at their other end on a first intermediate member 5. The intermediate member 5 which is likewise rotationally journalled is located on an eccentric element 25 the eccentricity "e" of which can be adjusted relative to the fixed axis 4.

The pivotal levers 6 thus respectively extend between the coupling elements 7 and the intermediate member 5 and rotate in a common plane. The pivot bearings 8, 9 associated with the pivotal levers 6 are schematically illustrated in the drawing.

The coupling elements 7 are preferably formed as clamping shoes which can engage in form and force-transmitting manner into the ring track 3 and are formed as elements which are free running when drawn and which clamp on abutment. I.e. can only act to transmit forces in one direction of running.

The first intermediate member 5 represents the output of the first change speed unit 19 and a second intermediate member 17 is arranged on the same eccentric element 25 on which this first intermediate member is located, with the second intermediate member 17 representing the input member of the second change speed unit 20.

This second intermediate member 17 is in turn coupled via pivotal levers 13 which carry clamping shoes 14 with a second ring track or race 12 which is formed on an annular drum-like output member 11 which can form the driven element or can be fixedly connected with a driven element lo.

In the same manner as in the first change speed unit 19 the pivotal levers 13 are also connected in the second change speed unit 20, via bearings 15, 16, with the associated intermediate member 17 and with the associated clamping shoes 14 respectively, and they rotate in one plane and are distributed around the periphery of the intermediate member 17.

The described construction of the transmission of the invention shows that this transmission is centrally symmetrically constructed in contrast to the known arrangements, whereby it is possible to minimise the variations or speed fluctuations which arise in the two sequential change speed units as a result of the function, while retaining a large change speed range which is determined by the product of the individual ratios of the two change speed units.

The variations or speed fluctuations in transmissions of this kind are known to be a consequence of the fact that, depending on the selected eccentricity which is the determining factor for the particular transmission ratio, the coupling elements 7, 13 only come into force transmitting engagement with the associated ring track 3, 12 during a part of their total rotation over 360°. Thus the coupling elements 7, 14 have to sequentially adopt the function of force or moment transmission and this coupling in and out of the individual coupling elements, and also the sequence of these coupling elements, leads to certain variations or speed fluctuations which are generally undesired.

The fluctuations can be substantially reduced through the inverse series connection of two change speed units, as shown in FIG. 1, in that the coupling elements 14 of the second change speed unit are angularly displaced relative to the coupling element 7 of the first change speed unit 19, with respect to their force transmitting engagement with the associated ring track 3 or 12 respectively, in such a way that the speed maxima of the first stage 19 are at least substantially in phase with the speed minima of the second stage. For the product formation which results with respect to the achievable transmission ratio through the inverse series connection one obtains in this way a smoothing of the transmission characteristic with optimising being possible in that the lever arms and the eccentricity of the second change speed unit can be selected relative to the first change speed unit in such a way that the speed fluctuations in the two change speed units are of at least substantially the same size.

A steplessly variable transmission as shown in its basic construction in FIG. 1 can be used in the most diverse fields of application, for example in mechanically or electrically driven machines, motor vehicles and the like. An advantageous application is the use in bicycles where this transmission can be accommodated without problem in a rear wheel hub in a particularly space saving embodiment.

Figure 2:
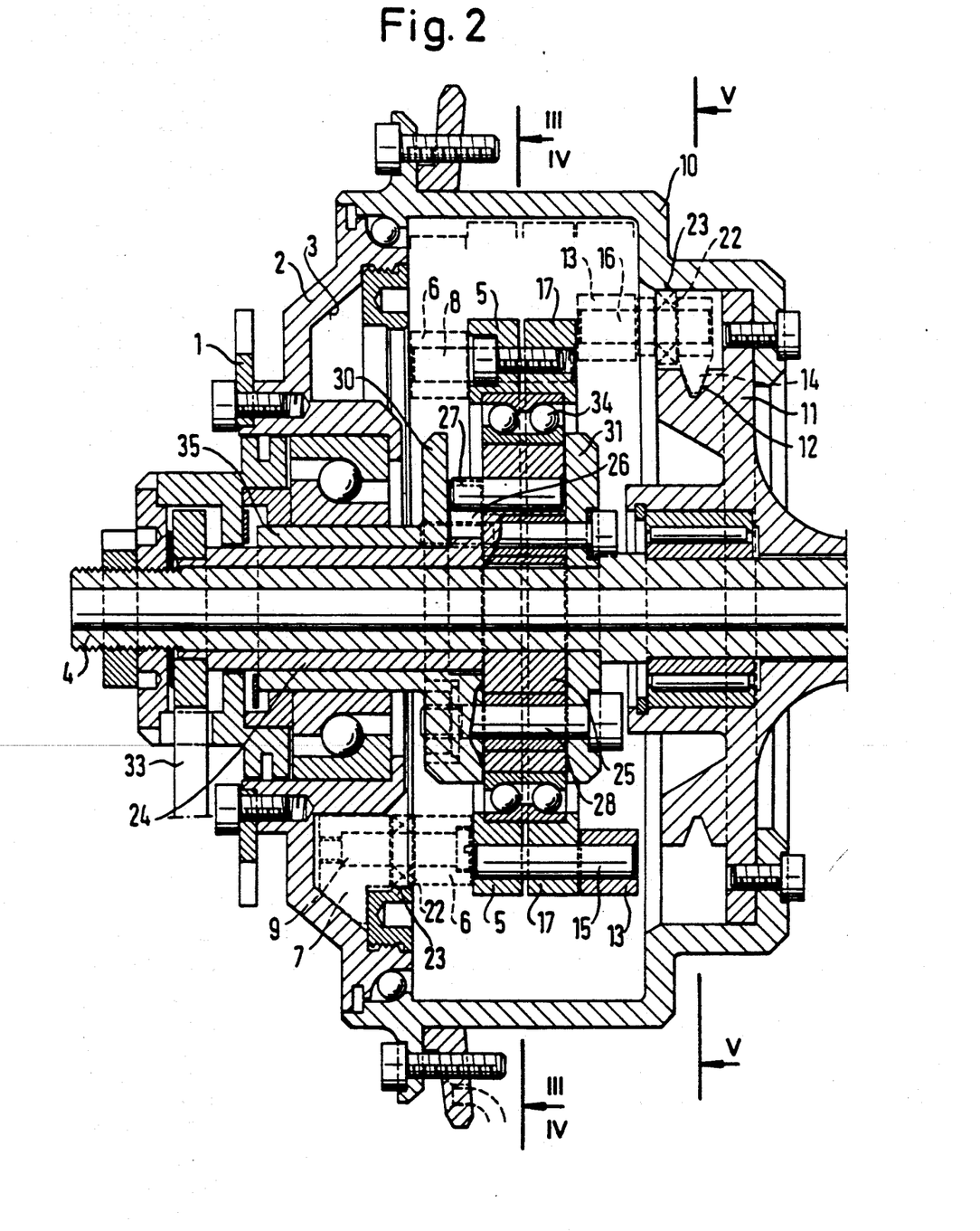

FIG. 2 shows an axial section of a rear wheel hub of a vehicle with an integrated steplessly variable transmission in accordance with the invention. In this representation the same reference numerals are used as in FIG. 1 for all parts which correspond to one another.

An element 1 in the form of a gear wheel drivable via a chain is fixedly screwed to a flange of a drum-like part 2 which forms the input member of the transmission. This drum-like part 2 is rotatably journalled with respect to a fixed axle 4 via a ball bearing and is provided in the region of its inner wall with the first ring track or race 3.

This ring track 3 cooperates with coupling elements 7 in the form of clamping shoes which act in one direction of running and which are pivotally or tiltably mounted by means of bearings 9 at one end of pivotal levers 6. The other respective end of each pivotal lever 6 is secured via a pivot bearing 8 to a first intermediate member 5 which is rotatably mounted on an eccentric element 25 by means of a bearing 34.

Five pivotal levers 6 distributed around the periphery are expediently used with associated coupling elements 7.

The coupling elements 7 can be braced in the illustrated embodiment on a track 23 via a bearing member 22 in each case.

In analogy to the first intermediate member 5 a second intermediate member 17 is likewise rotatably mounted on the eccentric element 25 and is fixedly connected with the first intermediate member, with the second intermediate member 17 likewise being of ring-like shape and carrying pivoted levers 13 via pivot bearings 15, with second coupling elements 14 being mounted at the other respective ends of the pivot levers via pivot bearings 16, and with the coupling elements 14 cooperating in turn with a ring track or race 12 which is provided on an output member 11. This rotatably journalled output member 11 is fixedly screwed to a hub drum part which forms the driven element 10. Mounting rings for the spokes of the rear wheel can be attached to this hub drum part.

The selection of the respectively desired transmission ratio takes place by adjustment of the eccentric element 25 relative to the fixed axle 4.

The disk-like eccentric element 25 is arranged between two plate-like restricting members 30, 31, the mutual spacing of which is fixed by spacer bolts, with one of these bolts simultaneously forming a fixed pivot axle 28 for the eccentric element 25. The restricting member 30 is fixed relative to the axle 4 via a cylindrical projection 35 and an actuating sleeve 24 extends radially within this cylindrical projection 35 and is connected at its outer end with an actuating lever 33 and has a fork 26 at its inner end which engages between the restriction member 30 and the eccentric element 25 and is coupled with a side spigot 27 of this eccentric element. The eccentric element 25 can be pivoted around the fixed axle 28 by pivoting of the fork 26, whereby an eccentric position is provided between the rotational axle 18 shown in FIG. 1 for the rotating intermediate members 5, 17 and the fixed axle 4, thereby changing the transmission ratio.

The translation characteristics and the force transmitting characteristics of this steplessly operating transmission can be influenced and optimised by various parameters. Of substantial importance in this connection are the selection of the diameter of the ring tracks 3, 12, the selection of the diameters of the pivot bearing circles for the pivotal levers 6, 13 at the intermediate members 5, 17 and also the lengths of the pivotal levers and the adjustable eccentricities. Furthermore, the angular displacement between the coupling elements 7 and 14 in the two stages of the transmission are of quite substantial importance since it is possible to minimise the fluctuations through this angular displacement.

Figure 3:
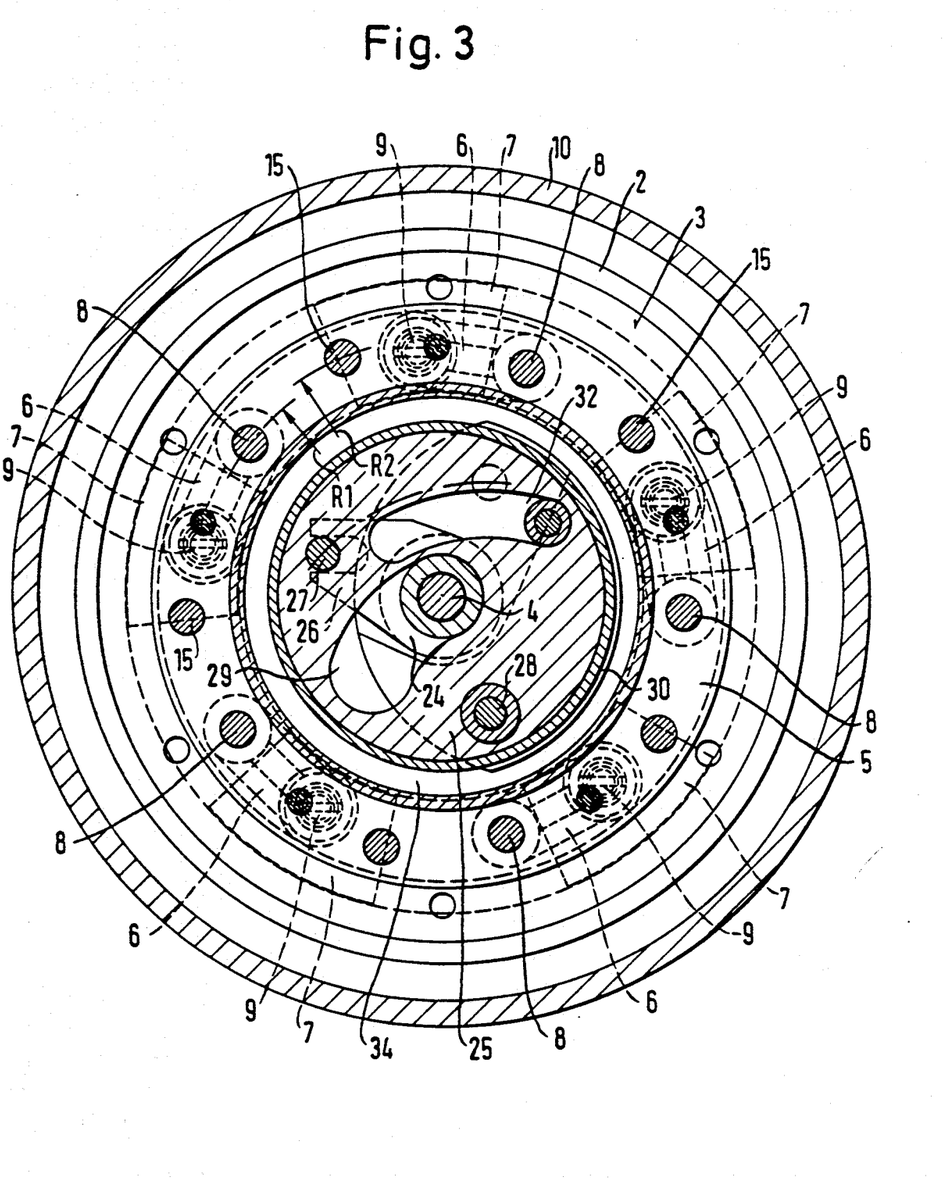

FIG. 3 shows a section for the first change speed unit of the transmission of FIG. 2, with this unit being located in the central state in which the fixed axle 4 coincides with the eccentric axis and the transmission ratio of this stage amounts to 1:1. The ring-like intermediate member 5 which is rotatably journalled on the eccentric element 25 via the bearing 24 thereby lies concentric to the fixed axle 4. Accordingly, the circle of radius R1 on which the pivot bearings 8 for the pivotal levers 6 are disposed is also concentric to the fixed axle 4, with the coupling elements 7 being mounted at the other ends of the pivotal levers 6 via bearings 9. The arrangement in this layout is preferably so contrived that in this centered state both pivot bearings 8, 9 of the pivotal levers 6 are located on the same circle.

It can also be seen in FIG. 3 that the pivot bearings 15 of the pivotal levers associated with the second change speed unit are disposed on a somewhat larger radius R2.

The fork 26 which belongs to the eccentric positioning device that is connected with the actuating sleeve 24 engages around the side spigot 27 of the eccentric element 25 which is pivotable about the fixed axle 28. In order to enable this pivotable movement a first part-circular cut-out 24 is provided in the eccentric element 25 for the fixed axle 4 and a second part-circular cut-out 32 is provided in the eccentric element 25 for a securing and spacer bolt.

If the fork 26 is pivoted in the clock-wise sense then this leads to an eccentric position of the eccentric element 21 relative to the fixed axle 4 and thus to an increase in the transmission ratio.

Figure 4:
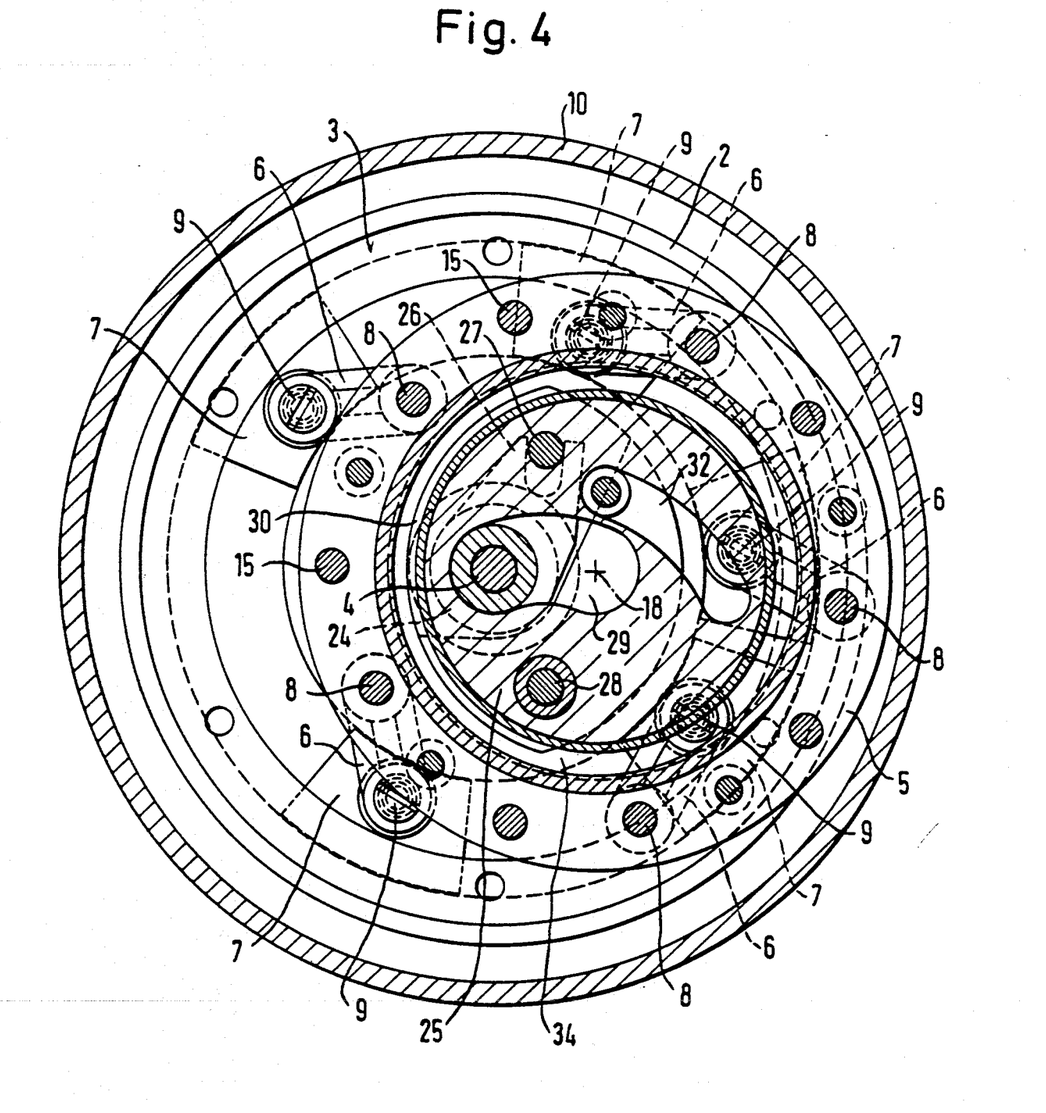

FIG. 4 shows the first transmission unit of FIG. 3 in the condition of maximum eccentricity. For this purpose the eccentric element 25 has been pivoted around the fixed axle 28 by means of the fork 26 so that the axis 18 of this eccentric element 25 now lies eccentric relative to the fixed axle 4 as is also schematically shown in FIG. 1.

As a result of this eccentric position considerable spacings result when considered over a peripheral angle of 360° between the pivot bearings 9 for the pivotal levers 6 on the intermediate member 5 and the ring track 3, which has the consequence that the coupling elements 7 are only sequentially operative to transmit force over a restricted and defined angular range and the coupling elements are in the idle state outside of this range. This principle of operation is described in detail in the French patent application 88 12 584.

Figure 5:
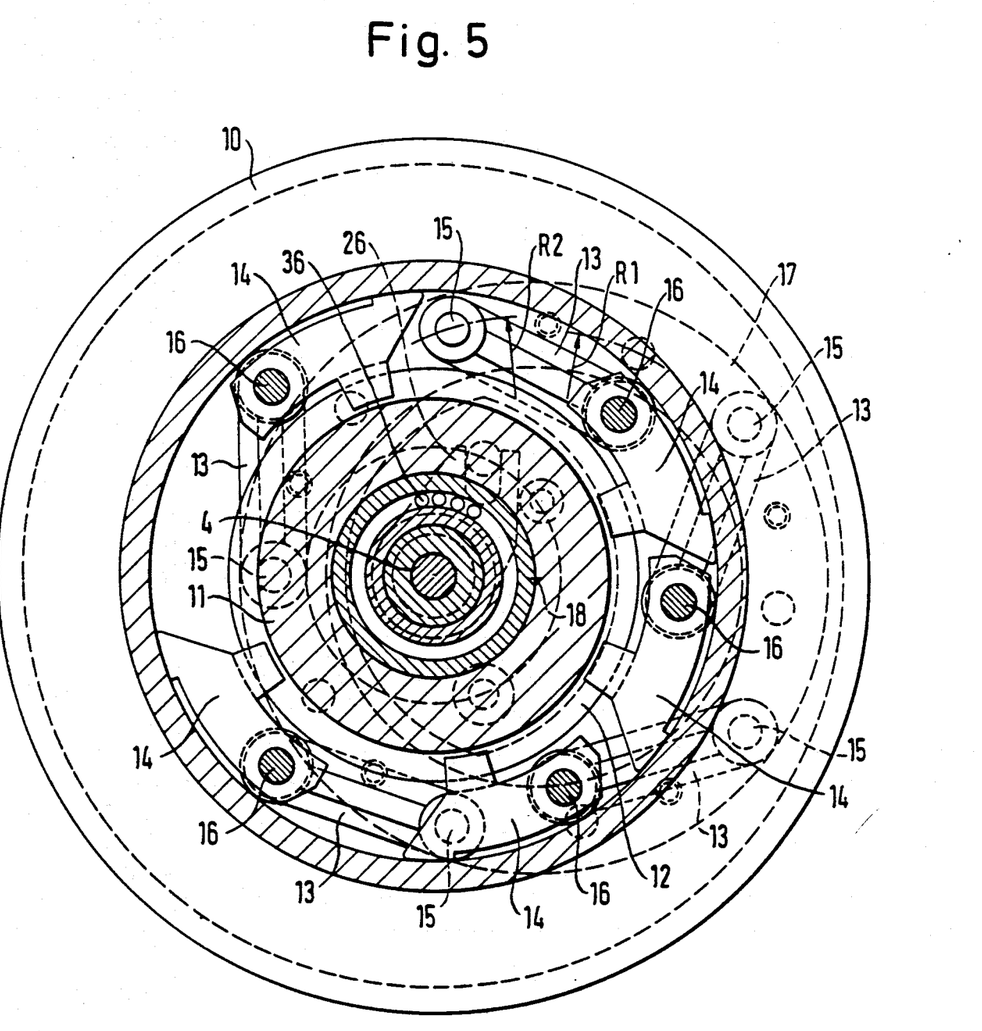

FIG. 5 shows a section through the central plane of the coupling elements of the second change speed unit, with this second change speed unit likewise being in the state of maximum eccentricity.

The driven element 10 is fixedly connected to the output member 11 which is rotatably journalled relative to the axle 4 via a needle bearing 36 and in which the second ring track 12 into which the coupling elements 14 engage is formed in the output member. The second ring-like intermediate member 17 which is arranged on the eccentric element in the manner which has already been explained lies with its axle 18 eccentric relative to the fixed axle 4 and thus differing engagement conditions relative to the ring track 12 result for the pivotal levers 13 and the coupling elements 14 connected thereto during rotation. This leads in the same manner as already explained in connection with the first change speed unit to the coupling elements 14, and thus also the pivotal levers 13 only being effective for force transmission within a defined angular range and being idle outside of this angular range.

The angular range of this second change speed unit which is effective for force transmission is arranged angularly displaced relative to the force transmitting angular range of the first change speed unit and in this way it is possible to average out to the largest possible degree the variations or speed fluctuations which arise in the two sequential change speed units, so that a uniform force transmission can be ensured which is as free as possible from fluctuations.

Figure 6:
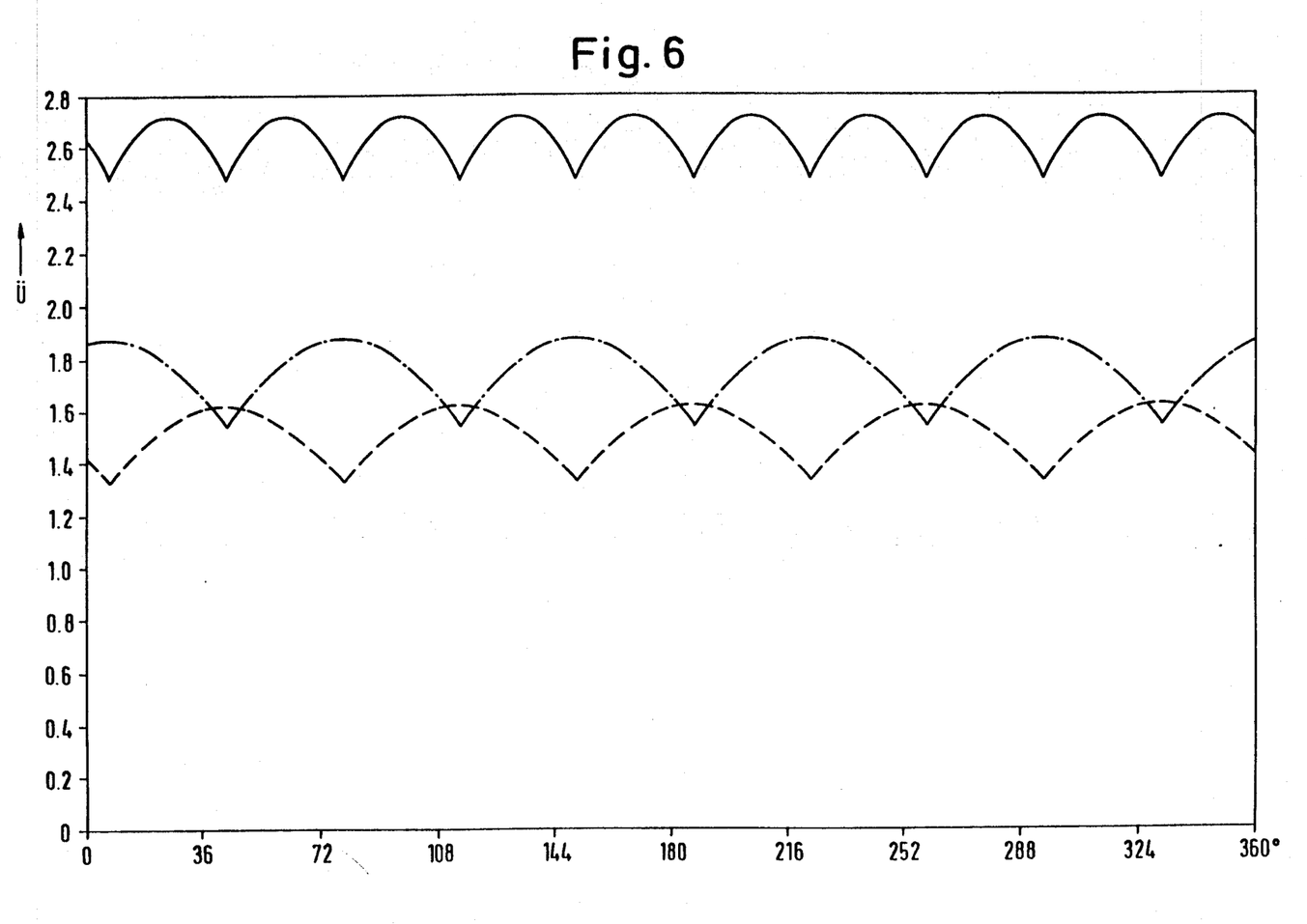

FIG. 6 shows in diagram form the cooperation between the first and second speed changing units in the context of the inverse series connection of the invention.

In this diagram the resulting transmission ratios are recorded on the abscissa above the angles of rotation recorded on the ordinate. The broken line curve is associated with the first change speed unit and the chain dotted curve is associated with the second change speed unit, with the overall transmission ratio being shown in the form of a solid line curve.

The fluctuations which result in the two change speed stages can be clearly recognised and originate from the sequential engagements of the coupling elements on the associated ring tracks within a specific angular range.

The overall transmission ratio represents the product of the individual ratios achieved in the two stages and it can clearly be seen that the fluctuations which arise at the output side are decisively lower than the fluctuations of the individual stages and that they practically no longer appear in disturbing manner.

This is a consequence of the inverse series connection which leads to central symmetry and which makes it possible to lay out and dimension the second speed changing unit relative to the first speed changing unit in such a way that the fluctuations are identical or almost similar, and also makes it possible to select the angular displacement between the two change speed units in such a way that the maxima of the fluctuations of the first change speed unit are at least in principle in phase with the minima of the fluctuations of the second stage, as is shown in FIG. 6.

I claim:

1. Steplessly variable transmission comprising a drivable element and a driving element which are rotatably and coaxially journalled and are connected together via at least two change speed units arranged sequentially, the change speed units having input and output members, the driving element being connected with the input member of the first sequentially arranged change speed unit and the drivable element being connected with the output member of the last sequentially arranged change speed unit, the change speed unit having the output member journalled axially parallel to the respective input member and being displaceable relative thereto, the input and output members of the change speed unit being coupled together by a plurality of pivotal levers having first and second ends, the first end pivotally journalled, and the second end having a coupling element which enters into force transmitting clamping engagement during operation with regions of a ring track, wherein the improvement comprises
   the change speed units combined pairwise inversely forming unit pairs having a first and second change speed unit having first and second eccentricities respectively, each unit pair having an eccentric positioning device which jointly actuates one of the members with the ring tracks and the members with the coupling elements.

2. Transmission in accordance with claim 1,
   wherein the input member has a first ring track and the output member has a second ring track, the first ring track being connected with a first rotatably journalled intermediate member via pivotal levers having first coupling elements and the second ring track being connected with a second rotatably journalled intermediate member via second pivotal levers having second coupling elements; and the first and second rotatably journalled intermediate members being journalled in a predeterminable relative position on an axis and both members being jointly adjustable by the eccentric positioning device relative to a fixed axle.

3. Transmission in accordance with claim 2,
   wherein the eccentric positioning device has an actuating sleeve arranged on the fixed axle with the actuating sleeve extending up to an eccentric element which carries the first and second intermediate members, the eccentric positioning device acting via a fork on a side spigot of the eccentric element, the eccentric positioning device being pivotally journalled about a fixed pivot axle and having at least one cut-out which receives the fixed axle.

4. Transmission in accordance with claim 3,
   wherein the eccentric positioning device has an actuating sleeve arranged on the fixed axle with the actuating sleeve extending to an eccentric element, the eccentric element being arranged between two axially fixed limiting members, the spacing of the limiting members specified by at least one spacer bolt, a first spacer bolt forming a fixed pivot axle for the eccentric element acting between the limiting member and the eccentric element.

5. Transmission in accordance with claim 1,
   wherein the coupling elements of the second change speed unit are angularly displaced relative to the coupling elements of the first change speed unit in such a way that the speed maxima of the first change speed unit are substantially in phase with the speed minima of the second change speed unit.

6. Transmission in accordance with claim 1,
   wherein the first and second eccentricities are different.

7. Transmission in accordance with claim 1,
   wherein the first and second change speed units have a plurality of first and second pivotal levers, respectively.

8. Transmission in accordance with claim 1,
   wherein the first and second change speed units have a plurality of first and second pivotal levers respectively, the second pivotal levers and the second eccentricity being selected so that the speed fluctuations of the first and second change speed units are substantially the same.

9. Transmission in accordance with claim 1,
   wherein the first and second change speed unit have first and second coupling elements respectively, the first and second coupling elements having first and second clamping shoes.

10. Transmission in accordance with claim 1,
    wherein the coupling elements have clamping shoes which are free-running when drawn and which clamp on abutment.

11. Transmission in accordance with claim 1,
    wherein the number of pivotal levers and coupling elements in the first and second change speed units is the same.

12. Transmission in accordance with claim 1,
    wherein axles carry the coupling element and are journalled to the pivotal levers, the axles being braced via a bearing member on the ring track coaxial to a fixed axle.

* * * * *